Dec. 26, 1961 S. W. PIERCE 3,014,415
METHOD AND MEANS FOR FORMING PAPERBOARD CARTONS
FROM BLANKS THEREFOR
Filed Dec. 31, 1958 8 Sheets-Sheet 1

INVENTOR.
SAMUEL W. PIERCE
BY
Parrott & Richards
ATTORNEYS

Dec. 26, 1961 S. W. PIERCE 3,014,415
METHOD AND MEANS FOR FORMING PAPERBOARD CARTONS
FROM BLANKS THEREFOR
Filed Dec. 31, 1958 8 Sheets-Sheet 3

INVENTOR.
SAMUEL W. PIERCE
BY
Parrott & Richards
ATTORNEYS

INVENTOR.
SAMUEL W. PIERCE

INVENTOR.
SAMUEL W. PIERCE
BY Parrott & Richards
ATTORNEYS

INVENTOR.
SAMUEL W. PIERCE
BY
Parrott & Richards
ATTORNEYS

INVENTOR.
SAMUEL W. PIERCE
BY
Parrott & Richards
ATTORNEYS

United States Patent Office 3,014,415
Patented Dec. 26, 1961

3,014,415
METHOD AND MEANS FOR FORMING PAPERBOARD CARTONS FROM BLANKS THEREFOR
Samuel W. Pierce, Atlanta, Ga., assignor, by mesne assignments, to The Mead Corporation, Dayton, Ohio, a corporation of Ohio
Filed Dec. 31, 1958, Ser. No. 784,247
9 Claims. (Cl. 93—49)

This invention relates to the forming of paperboard cartons on apparatus of the type arranged for feeding a carton blank along a longitudinal path while folding and gluing the panel elements of the blank to form the carton structure therefrom, and more particularly to an improved method and means for folding panel portions of such a blank about folding axes extending transversely of the longitudinal blank feeding path.

Briefly described, the method and means of the present invention is characterized by an arrangement for applying folding pressure to the blank panel portions as the blank being fed passes a transverse axis about which folding means are arranged to revolve. The result of this arrangement is to lessen very substantially the extent and size of the equipment needed to perform the folding operation and to make possible the folding of both leading and trailing panel portions that must be folded in opposite directions about spaced score lines by respective folding means revolving about a common axis.

These and other features of the present invention are described in further detail below in connection with the accompanying drawings, in which.

Figure 1:
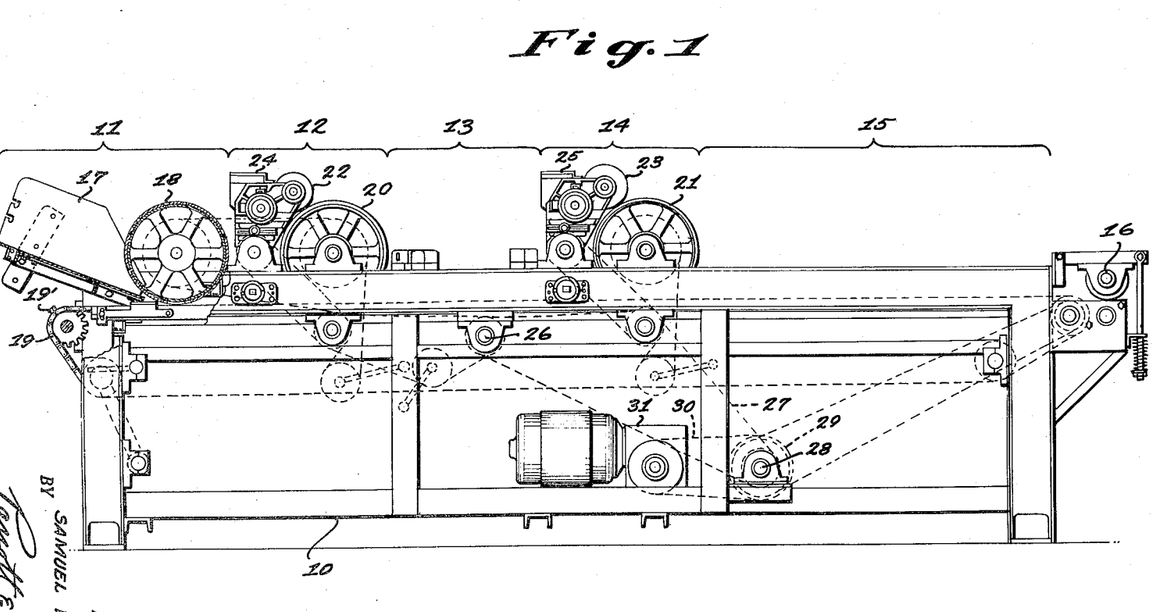
FIG. 1 is a side elevation of apparatus embodying folding means arranged according to the present invention.
Figure 2:
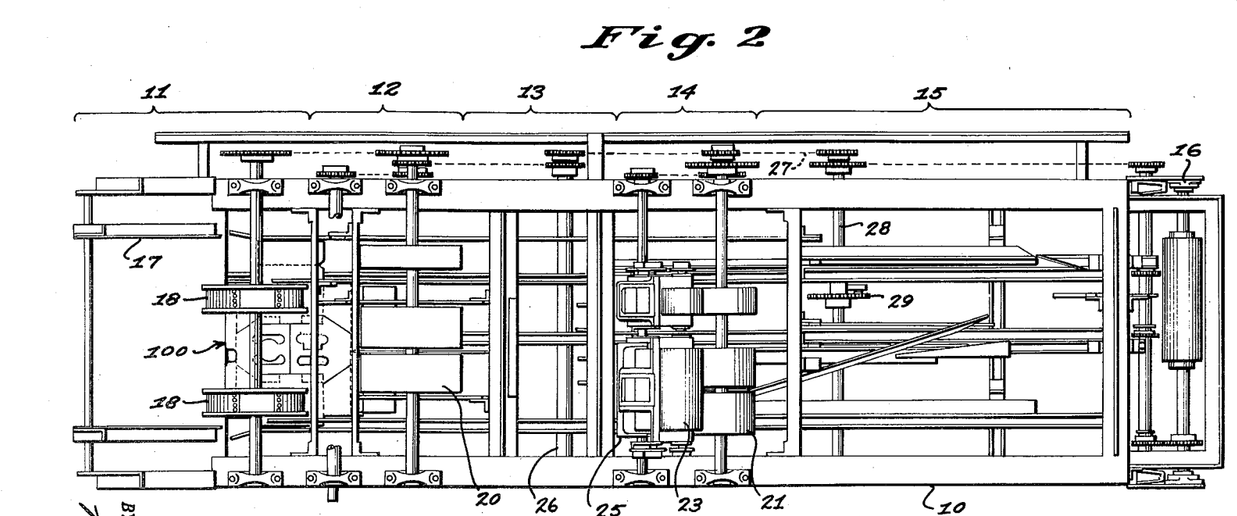
FIG. 2 is a plan view corresponding generally to FIG. 1.
Figure 3:
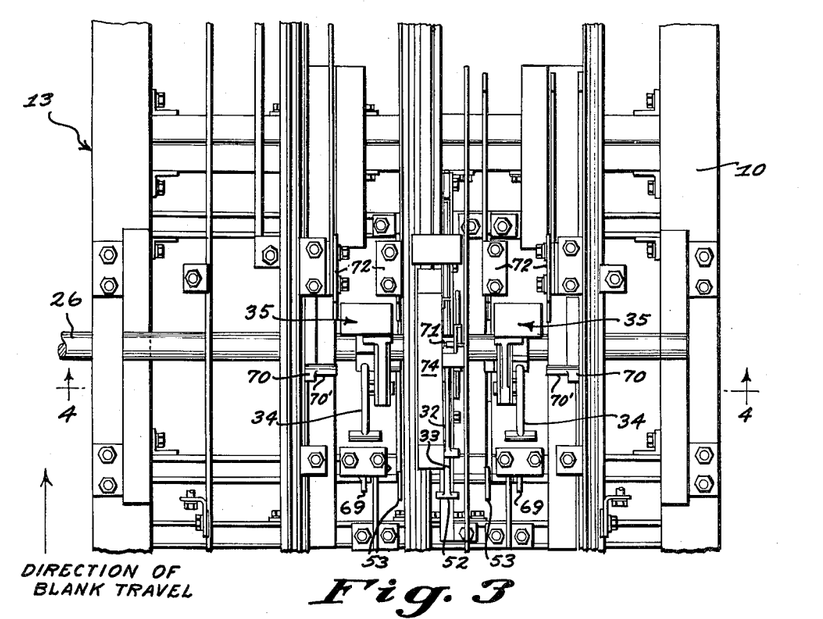
FIG. 3 is an enlarged fragmentary plan view of the folding section of the apparatus embodying the present invention, with the top frame members and gluing means thereat removed to show the folding elements.
Figure 4:
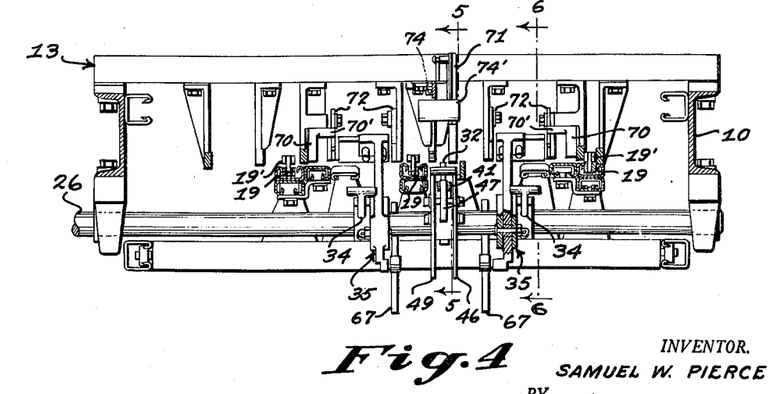
FIG. 4 is a sectional detail taken substantially at the line 4—4 in FIG. 3.
Figure 5:
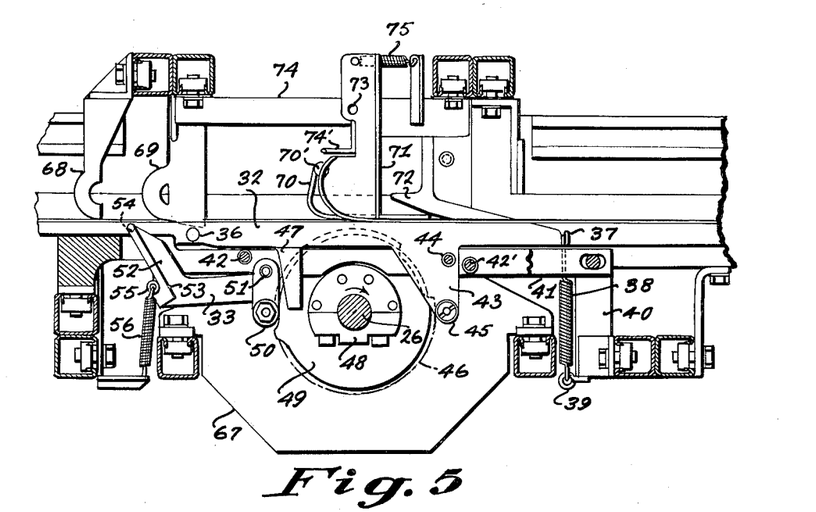
FIG. 5 is a longitudinal sectional detail taken substantially at the line 5—5 in FIG. 4.
Figure 6:
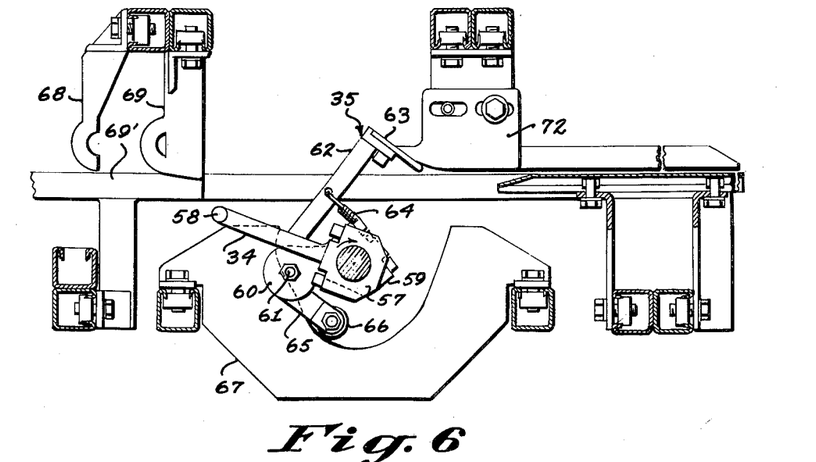
FIG. 6 is a further longitudinal sectional detail taken substantially at the line 6—6 in FIG. 4.

Referring now in detail to the drawings, FIGS. 1 and 2 indicate the general arrangement of carton forming apparatus which may incorporate the folding means of the present invention to particular advantage. In general arrangement, the apparatus is conventional in that an elongated frame structure 10 has a carton blank feeding station 11 mounted at one end thereof to feed carton blanks 100 (see FIG. 2) for travel past a first gluing station 12 to a transverse folding section 13, then past a second gluing station 14 to a longitudinal folding section 15, and finally to a delivery roll means 16 at the other end of the frame structure 10 at which a suitable form of carton delivery mechanism (not shown) may be arranged in a form such as is shown in U.S. Patent No. 2,133,727, for example, to receive folded and glued cartons from the apparatus and deliver them in an orderly fashion after maintaining them under pressure for a sufficient time to allow setting of the glue securing the folded carton structure.

The blank feeding station 11 comprises a hopper 17 and a pair of feed wheels 18 arranged for ejecting the carton blanks 100 successively in spaced relation onto feed chains 19 having feed lugs 19' spaced thereon for engaging the trailing edges of the blanks and advancing them along a longitudinal path through the apparatus, all in the same general manner disclosed representatively in U.S. Patent No. 2,291,063. The first and second gluing stations 12 and 14 likewise follow generally the common prior art arrangement, such as is illustrated in U.S. Patent No. 2,344,427, for applying glue selectively at the required areas of the advancing blanks 100 by means of padded adhesive applying drums 20 and 21 supplied with adhesive by transfer rolls 22 and 23 from glue pots 24 and 25. Also, beyond the second glue applying station 14, the longitudinal folding section 15 employs a usual prior art arrangement of folding guides to complete the carton folding about axes extending parallel to the longitudinal path along which the blanks 100 are advanced by the feed chains 19.

In association with the foregoing portions of the apparatus that follow conventional lines, it is the transverse folding section 13 that is arranged uniquely according to the present invention, as illustrated further in FIGS. 3, 4, 5 and 6, in relation to a common transverse operating axis at 26 from which the several transverse folding elements are all actuated. The shaft forming this common operating axis 26 is driven through a chain and sprocket connection, indicated in FIGS. 1 and 2 at 27, from a countershaft 28 on which a slip clutch sprocket 29 is connected, as indicated at 30, to a driving gear motor 31 which is also arranged through the countershaft 28 to drive the other operating portions of the apparatus as well.

The several transverse folding elements actuated from the common operating shaft 26 comprise a flexing member 32, an auxiliary lifting member 33, leading edge folding members 34, and trailing edge folding members 35. The flexing member 32, as seen best in FIG. 5, has the form of an elongated lever arm aligned with the longitudinal path of travel of the carton blanks 100 and normally disposed just below the level at which the blanks 100 travel, with a cross bar nose piece 36 arranged at the end thereof extending oppositely to the advancing direction of the blanks. At its other end, the flexing member 32 is formed with a hook portion 37 for attachment of a tension spring 38 thereat to exert a downward bias from an anchor point at 39 on a support bracket 40 which in turn extends upwardly to carry the adjacent end of a cross bracket 41 on which the flexing member 32 is pivoted. The cross bracket 41 is formed throughout the major portion of its length with spaced parallel leg portions that are braced in parallel relation by spacers at 42 and 42' and between which a depending leg portion 43, spaced intermediately on the flexing member 32 from its biased end, is pivoted at 44 and extends further downwardly to carry a cam follower 45 in relation to an actuating cam 46. An additional depending leg portion 47, spaced intermediately on the flexing member 32 toward its nose end, is also disposed slidably between the spaced legs of the cross bracket 41 to stabilize the pivoting motion of the flexing member 32.

The above noted actuating cam 46 for the flexing member 32 is mounted on the previously mentioned common operating shaft 26 at a common hub member 48 which also carries a second actuating 49 that operates auxiliary lifting member 33 through a cam follower at 50 about a pivot axis 51 on which the lifting member 33 is carried between the spaced legs of the cross bracket 41. From its pivot axis 51, the lifting member 33 extends beneath the cross bracket 41 oppositely with respect to the advancing direction of the blanks 100 and beyond the adjacent end of the flexing member 32, where it carries an upwardly extending middle finger element 52 and a pair of side finger elements 53 spaced to each side thereof with an equal upward extent. The middle finger element 52 extends upwardly in sliding relation between the legs of the cross bracket 41 and is fitted with a cross bar nose piece 54 at the upper end thereof, while having an anchor ring 55 attached adjacent its base end from which a tension spring 56 is extended to maintain a downward bias on the lifting member 33.

The remaining transverse folding elements actuated from the common operating shaft 26, namely, the leading edge and trailing edge folding members 34 and 35, are arranged directly on the shaft 26 to revolve thereabout. The leading edge folding members 34 are fixed on the shaft 26 at hub portions 57 and extend therefrom as radial arms with crossbar pieces 58 at their extending ends. The trailing edge folding members 35 are likewise fixed on the shaft 26 at hub portions 59 from which radial arm portions 60 extend to carry bell cranks pivotally at 61, with one arm 62 of each bell crank fitted at its extending end with a flap folding contact plate 63 and engaged intermediate its length by a tension spring 64 extended from the related hub portion 59 to bias the other bell crank arm portions 65 so that cam followers 66 at the extending ends thereof are maintained in riding contact with fixed cam plates 67.

In addition to these folding elements actuated from the operating shaft 26, the transverse folding section 13 further comprises fixed fingers 68 and 69, side folding flippers 70, a center hold-down shoe 71, and final folding shoes 72, all of which are mounted above the level at which the advancing blanks 100 travel. The fixed fingers 68 are spaced in advance of the fixed fingers 69, and the lower ends of the fixed fingers 68 are disposed substantially at the level of the advancing blanks 100, while the fingers 69 are formed and disposed to extend below this level as determined by a support rail illustrated at 69' in FIG. 6, so that these fixed fingers 69 are located for downwardly flexing action in opposition to the support rail 69' as is explained further below. The fixed fingers 68 have an advanced spacing in relation to the operation of the pivoted lifting member 33, as will also appear presently.

The side folding flippers 70 have a body portion that is mounted to allow the advancing blanks 100 to pass thereunder and that is located in side edge relation to the leading edge portions that are to be folded in the advancing blanks 100, while having lateral pins 70' arranged upwardly thereon with an inwardly extending disposition for initial folding action in relation to the leading edge folding members 34 in the manner noted further below. The center holddown shoe 71 is pivoted at 73 on a top support bracket 74 that incorporates a positioning leg member 74' against which the holddown shoe 71 is biased by a tension spring 75, for yielding in the event of jamming, so that the lower end of the holddown shoe 71 normally rides centrally of the advancing blanks 100 for action thereon in relation to the trailing edge members 35, while the final folding shoes 72 are fixed in riding relation with respect to the advancing blanks 100 below the holddown shoe 71 to complete the trailing edge folding action initiated by the folding members 35 as explained further below.

Figures 18, 19, 20, 21:
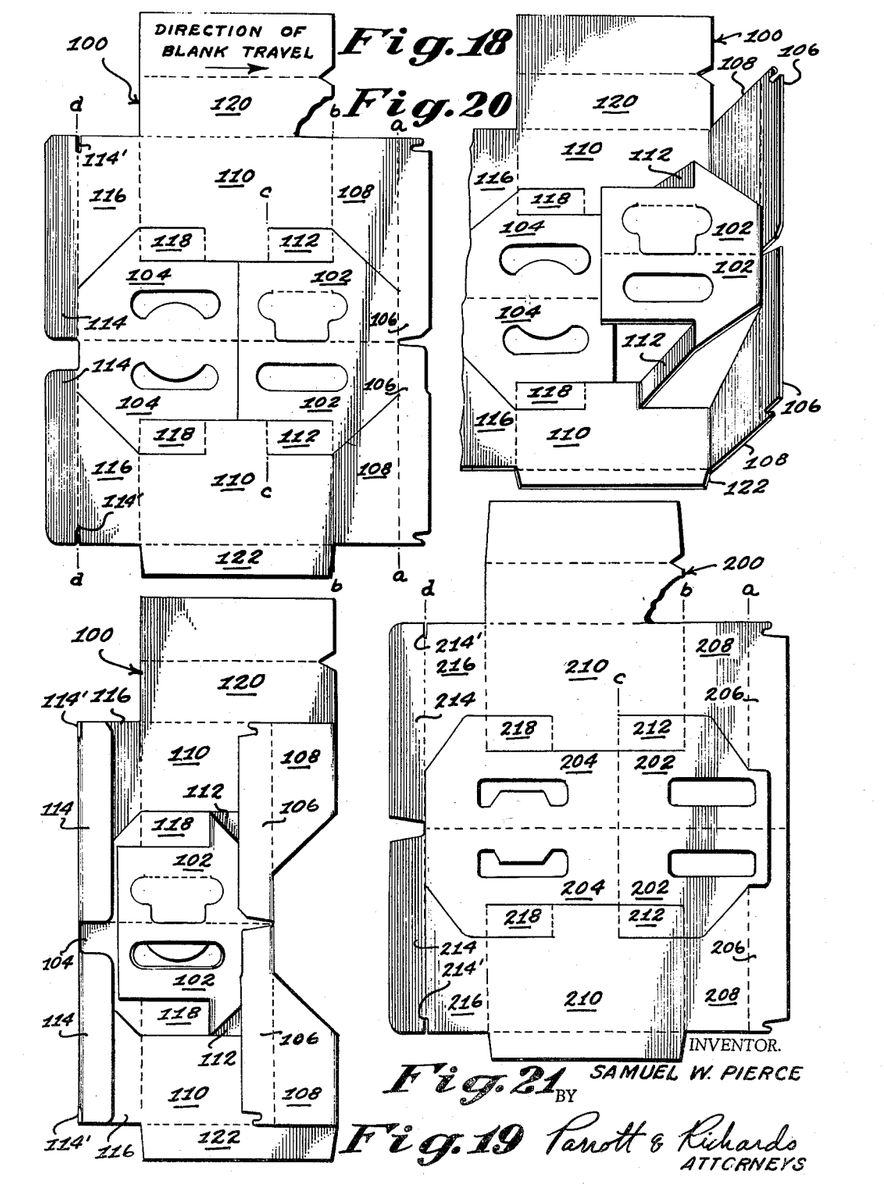
FIG. 18 is a plan view of a representative form of carton blank that may be folded in the manner illustrated in FIGS. 7 to 17.
FIG. 19 is a corresponding plan view of the FIG. 18 blank following the leading and trailing panel portion folding that is accomplished according to the present invention.
FIG. 20 is a perspective view illustrating further the nature of the leading panel portion folding that is accomplished.
FIG. 21 is a plan view of a modified form of carton blank that may be alternatively folded with apparatus provided according to the present invention.

FIGS. 7 through 17 illustrate progressively the folding action carried out at the transverse folding section 13 on carton blanks of the type illustrated in FIGS. 18, 19 and 20 in which the illustrated carton blank 100 follows generally the form disclosed in U.S. Patent No. 2,776,072.

As shown, the blank 100 comprises a pair of inner handle panels 102 aligned with a pair of outer handle panels 104 along a longitudinal folding axis, and with the inner handle panels 102 forming leading portions of the blank 100, in relation to the direction in which the advancing blanks 100 travel as indicated by the directional arrow at FIG. 18. Leading edge flaps 106 are foldably joined to the inner handle panels 102 along a transverse folding axis $a$, and these leading edge flaps 106 are likewise foldably joined along the same axis $a$ to end wall panels 108 slit in the blank 100 adjacent the inner handle panels 102. The end wall panels 108 are in turn foldably joined along a transverse folding axis $b$ to side wall panels 110 that are also connected with the inner handle panels 102 through partition strips 112, that are foldably arranged between the folding axis $b$ at the inner handle panels 102 and a transverse folding axis $c$ at side wall panels 110. The outer handle panels 104 likewise have trailing edge flaps 114 foldably joined thereto along a transverse folding axis $d$ at which end wall panels 116 are arranged in relation to the side wall panels 110, and in further relation to partition strips 118 connecting the side walls 110 with the outer handle panels 104, in a substantially symmetrical pattern with respect to the inner handle panel arrangement previously described. In addition, the blank 100 comprises a bottom wall panel 120 foldably hinged on one side wall 110 and a related bottom wall securing flap 122 foldably hinged on the other side wall panel 110.

The transverse folding of the blank 100 takes place about the respective folding axes $a$, $b$, $c$ and $d$ to develop the blank in the form illustrated in FIG. 19, in which the inner handle panels 102 are shown superimposed on the outer handle panels 104, with the end wall panels 108 and partition strips 112 doubled inwardly of the blank, and with both the leading and trailing edge flap members 106 and 114 respectively overlapping the inner and outer handle panels 102 and 104. The manner in which the leading portion of the blank 100 is folded to accomplish this development is illustrated further in FIG. 20 in which the end walls 108 are shown in the course of being doubled inwardly about the transverse folding axis $b$, while the partition strips 112 are doubled in relation thereto about the transverse folding axis $c$, which requires reverse folding of the leading edge flaps 106 and partition strips 12 at the transverse folding axes $a$ and $b$ in order to transpose the inner handle panels 102 to an overlying disposition with respect to the outer handle panels 104.

Figure 7:
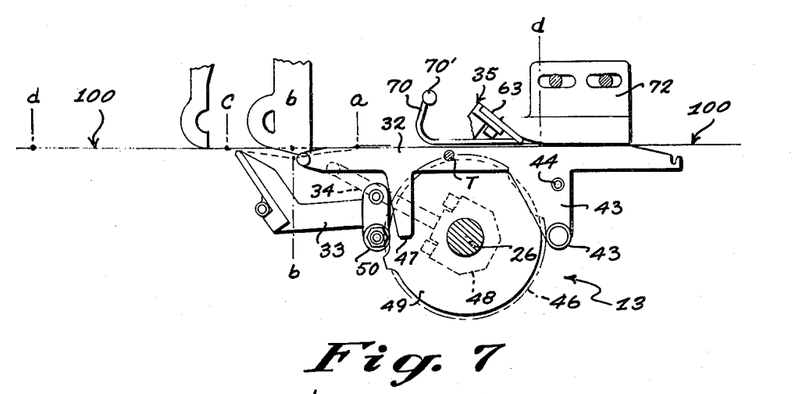
FIGS. 7 to 17, inclusive, are related diagrammatic illustrations showing the progressive folding development carried out according to the present invention.

This folding of the leading portions of the blank 100 is accomplished at the transverse folding section 13 in the progressive manner illustrated in the previously mentioned FIGS. 7 to 17. In FIG. 7, the blank 100 is represented at the timed position when the elements at the transverse folding section 13 first commenced to act thereon. This timed position is represented relatively by a timing dot T in FIG. 7 located at one pitch length of the feed chains 19 in advance of the vertical center line through the common operating axis 26. At this FIG. 7 position, the blank 100 is advanced beneath the fixed fingers 69 so that the end walls 108 which ride beneath these fingers 69 are depressed in relation to the adjacent partition strips 112, while the partition strips are supported on the support rail 69'. The centrally disposed flexing member 32 is further allowed to pivot upwardly by the actuating cam 46 as the blank 100 advances to the next timed position shown in FIG. 8. This action of the fixed fingers 69, the flexing member 32 and the support rail 69' serves to break free the adjacent inner handle panels 102, the partition strips 112 and the end wall panels 108 and to eliminate the necessity of pre-breaking the score lines at the folding axes $a$, $b$ and $c$ in order to condition the blank for further folding at these points.

Figure 8:
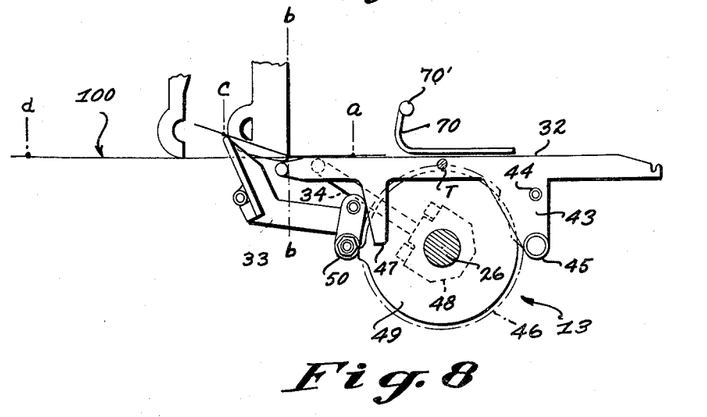
Figure 9:
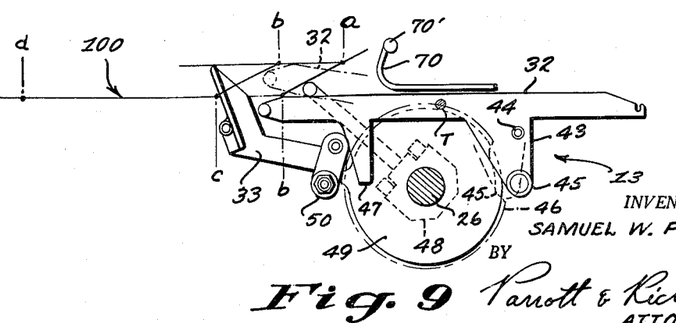
Figure 10:
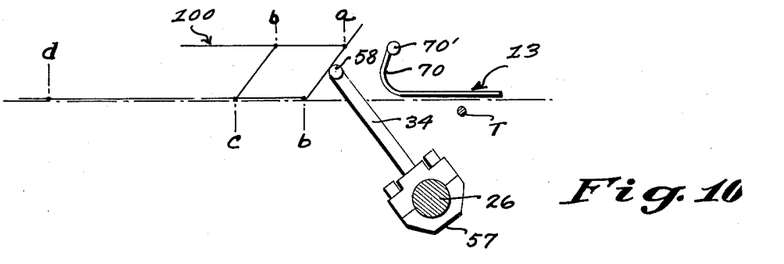
Figure 11:
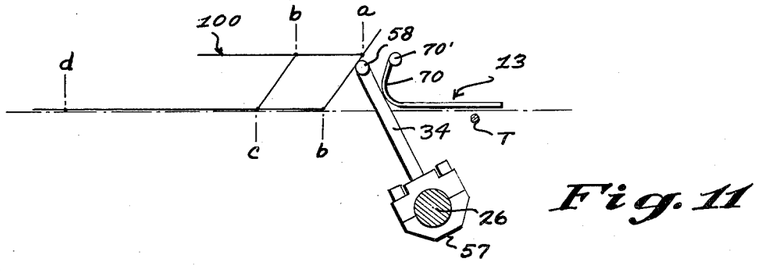
Figure 12:
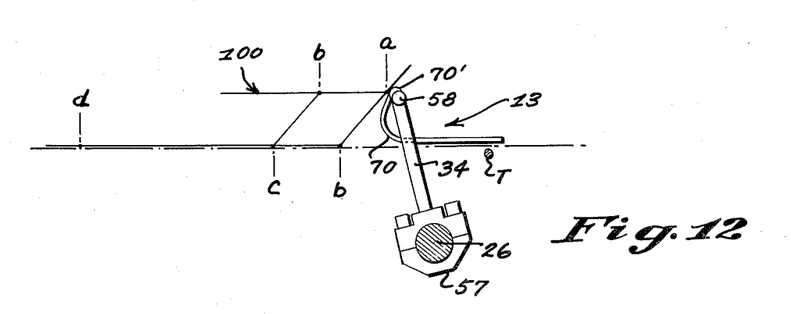
Figure 13:
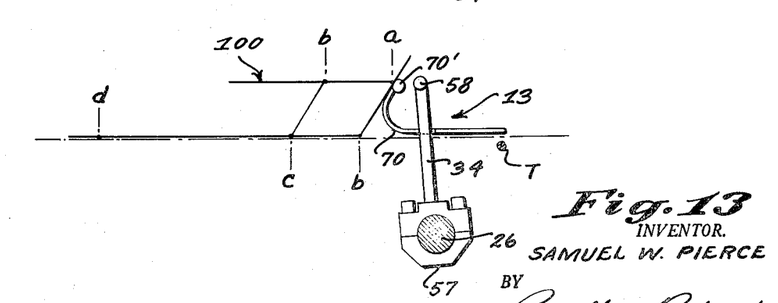
Figure 14:
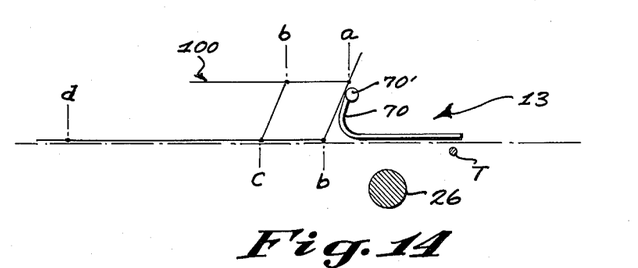
Figure 15:
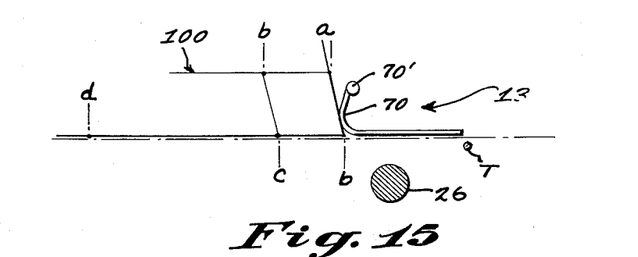
Figure 16:
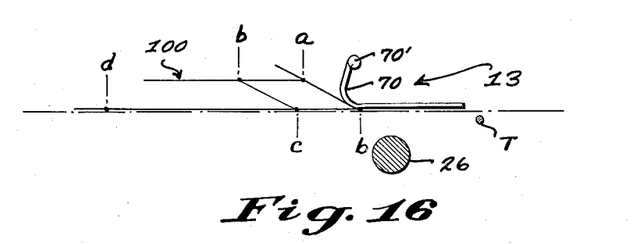
Figure 17:
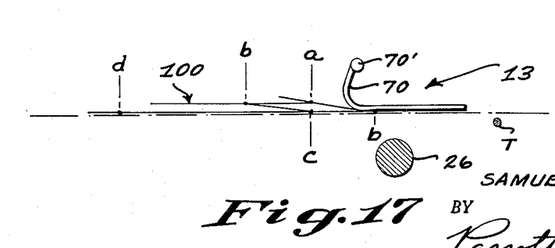

FIG. 8 represents the blank 100 as further advanced to the position at which the timing dot T coincides with the vertical center line through the common operating shaft 26. At this timed position the actuating cam 46 causes the lifting member 33 to rise beneath the inner handle panels 102 so as to raise the trailing edges thereof free of any possible hanging on the outer handle panels 104 as the folding continues under the action of the leading edge folding members 34 which at this position are revolved to a disposition directly beneath the end wall panels 108. As a result, upon further advance of the blank 100, as seen in FIG. 9, the continued revolving motion of the folding members 34 causes the extending ends thereof to rise above the level of the advancing blanks 100 and start the inward doubling of the end walls 108 about the folding axis b, in consequence of which the related inward doubling of the partition strips 112 about the folding axis c likewise takes place. This folding development continues progressively with the related continuing advance of the blank 100 and continued revolving motion of the folding members 34, as illustrated in FIGS. 10 and 11, until the relative advance of the blank 100 and revolving motion of the folding members 34 result in delivering the partially folded leading edge portions of the blank 100 to the side folding flippers 70 at the lateral pins 70' thereon, as seen in FIG. 12. The side flippers 70, being fixed, act in the nature of abutments with respect to the advancing blank 100 and serve to complete the folding of the leading edge blank portions in the manner illustrated progressively in FIGS. 13 through 17.

Having accomplished this folding of the leading blank portions in the above described manner, all that remains to complete the transverse folding of the blank 100 to the form illustrated in FIG. 20 is the inward folding of the trailing edge flaps 114 about the transverse folding axis $d$ to an overlying relation with respect to the outer handle panel 104, and this is accomplished by the trailing edge folding members 35 in relation to the side folding flippers 70, the holddown shoe 71, and the final folding shoes 72. For this purpose, the trailing edge folding members 35 are timed by the fixed cam plates 67 to have the contact plates 63 thereof rise beneath the trailing edge flap members 114 and press upwardly thereon as the transverse folding axis $d$ passes the vertical center line of the transverse folding section 13. The holddown shoe 71 is disposed to ride the top face of the blank 100 in alignment with the spacing between the adjacent ends of the trailing edge flaps 114 so as to hold the central portion of blank 100 downwardly against the upward folding pressure of the folding members 35 at this time, while the side folding flippers 70 serve a comparable purpose at the outer edges of the side wall panels 110. It will be evident that the outer ends of the trailing edge flaps 114 will also be aligned to ride beneath the side folding flippers 70 as arranged in the above noted manner, and it should be further noted that slits 114' are provided in the blank 100 at the outer ends of the transverse folding axis $d$ so that as the contact plates 63 of the trailing edge folding members 35 continue to rise and press the trailing edge flap members 114 up and over in a circular path about the transverse folding axis $d$, the ends of the trailing edge flaps 114 that are riding beneath the side flipper members 70 pull out and snap over the flipper members 70, being allowed to flex for this purpose by the above mentioned slits 114'. The outer ends of the trailing edge flaps 114 then ride on top of the flipper members 70 while the trailing edge contact plates 63 continue to fold the trailing edge flaps 114 and hold them down until the folded flaps 114 pass beneath the final folding shoes 72; the relative disposition of the trailing edge folding member 35, and contact plate 63 thereof, in relation to the folding shoes 72 upon completion of this folding action being illustrated in FIGS. 6 and 7, and the disposition of the inwardly doubled trailing edge flaps 114 beneath the final folding shoes 72 at this time being further indicated in FIG. 7.

The result of the foregoing arrangement of the transverse folding section 13 is to accomplish the necessary transverse folding steps in a carton blank of the type illustrated by the blank 100 is a considerably reduced space and with a substantially simpler arrangement of folding elements than has heretofore been commonly employed. In this connection, it should also be noted that the principles involved in the above described arrangement of the transverse folding section 13 may be employed similarly for folding specifically different carton blanks of the same general type. For example, FIG. 21 illustrates a modified form of carton blank 200 that might be alternatively folded according to the present invention.

The carton blank 200 is of the type disclosed in U.S. Patent No. 2,537,615, and differs principally from the blank 100 previously described in that the inner handle panels 202 thereof are arranged for doubling in relation to outer handle panels 204 about the transverse folding axis $c$, while the leading edge flaps 206 thereof are not directly connected to the inner handle panels 202, but are again arranged along the transverse folding axis $a$ on end walls 208 which are in turn joined at the transverse folding axis $b$ to side wall panels 210, with transverse partition strips 212 connecting the side wall panels 210 and the inner handle panels 202 between the folding axes $b$ and $c$. Trailing edge flaps 214 are again foldably joined to the outer handle panels 204 along the transverse folding axis $d$, at the outer ends of which slits 214' are provided in the manner and for the purpose of the comparable previously noted slits 114', and end wall panels 216 and partition strips 218 are arranged between the side wall panels 10 and the trailing edge flaps 214 and outer handle panels 204 respectively. As far as the folding of the trailing edge flaps 214 is concerned, this may be done in exactly the same way as described above in connection with the trailing edge flaps 114 of the blank 100. At the leading portions of the blank 200, however, it will be noted that the folding will all take place about the transverse folding axes $b$ and $c$ with inner handle panels 202 being doubled inwardly about the transverse axis $c$ in relation to following inward doubling of the end walls 208, and during which folding the partition strips 212 and leading edge flap members 206 must be folded with the inner handle panels 202 and end wall panels 208 without any differential folding. In view of this difference instead of the lifting action provided at the inner handle panels 102 in the blank 100 by the lifting member 33, it would only be necessary to make comparable provision for starting the inward doubling of the inner handle panels 202 in advance of the end walls 208 so as to complete the folding of these blank portions in the manner previously described above.

The present invention has been described in detail above for purposes of illustration only and is not intended to be limited by this description or otherwise except as defined in the appended claims.

We claim:

1. In a machine for forming paperboard cartons from a blank therefor having adjacent panel portions that must be folded double and relatively in the same direction about spaced parallel score lines into ultimate partially overlapping relation, movable carrier means for advancing said blank continuously with said adjacent panel portions leading, with said spaced parallel score lines extending transversely of the direction of advance, and with the direction of advance opposite to the direction in which said panel portions must be folded about said score lines, a first means acting on said advancing blank for flexing said adjacent panel portions oppositely downward and upward with respect to said carrier means and thereby initially freeing said panel portions for relative folding with respect to each other, a second means for immediately lifting with respect to said carrier means as said blank advances further thereon those of said adjacent panel portions that are foldable at the trailing of said spaced parallel score lines and thereby disposing said panel portions for relative folding about said trailing score lines, a third means for then immediately partially folding said adjacent panel portions relatively about said spaced parallel score lines in a substantial extent during the continued advance of said blank on said carrier means, fixed means mounted above said carrier means for completing the relative doubling folding of said adjacent panel portions as said partially folded blank advances thereunder on said carrier means, and means carried on a common operating axis located transversely below said carrier means and adjacent said fixed means for actuating said first, second and third means in sequence for the purposes stated, whereby said advancing blank rides beneath said fixed means immediately following sequential action thereon by said first, second and third means.

2. In a machine for forming paperboard cartons from a blank therefor having adjacent panel portions that must be folded double and relatively in the same direction about respective spaced parallel score lines into ultimate partially overlapping relation, movable carrier means for advancing said blank continuously with said spaced parallel score lines extending transversely of the direction of advance and said adjacent panel portions extending respectively in leading relation from said score lines, fixed means mounted above said carrier means in the path of said panel portions for completing the relative doubling thereof by abutment therewith as said blank advances thereunder on said carrier means, and means revolving about an axis located transversely below said carrier means in relation to the advance of said blank thereon and having a panel engaging portion that moves from below the path of the advancing blank up through said path and subsequently down through said path for engaging said adjacent panel portion in advance of said score lines for partially folding to a raised disposition and delivering said panel portions so disposed for folding abutment at said fixed means, said panel engaging portion passing down through said path in advance of the folded blank.

3. In a machine for forming paperboard bottle cartons from a blank therefor of the type having a pair of inner handle panel portions arranged symmetrically with respect to a medial axis of said blank and inwardly between adjacent wall panel portions with spaced parallel score lines arranged transversely of said medial blank axis about which said handle panel and wall panel portions must be folded double and relatively in the same direction into ultimate partially overlapping relation, movable carrier means for advancing said blank continuously in the direction of said medial axis and oppositely with respect to the direction in which said panel portions must be folded about said score lines and with said handle panel portions foldably about the trailing of said score lines, stationary finger members extending downwardly in the path of said advancing blank for depressing said wall panel portions as said blank rides thereunder on said carrier means and a first pivoted arm member disposed longitudinally below the path of said advancing blank for concurrently pressing upwardly said handle panel portions and thereby freeing said panel portions for subsequent relative folding, a second pivoted arm member disposed longitudinally below said path for immediately lifting said handle panel portions and thereby disposing said panel portions for relative folding about said trailing score lines, radially extending arm members revolving about an axis located transversely below said carrier means for then immediately partially folding said handle panel and wall panel portions relatively about said spaced parallel score lines in a substantial extent during continued advance of said blank on said carrier means, and means carried at the axis about which said radially extending arm members revolve for actuating said first and second pivoted arm members sequentially in phase therewith.

4. In a machine for forming paper board bottle cartons from a blank therefor of the type having a pair of inner handle panel portions arranged symmetrically with respect to a medial axis of said blank and inwardly between adjacent wall panel portions with spaced parallel score lines arranged transversely of said medial blank axis about which said handle panel and wall panel portions must be respectively and relatively folded double into ultimate partially overlapping relation, movable carrier means for advancing said blank continuously in the direction of said medial axis and oppositely with respect to the direction in which said panel portions must be folded about said score lines, fixed means mounted above said carrier means in the path of said panel portions for completing the relative doubling folding thereof by abutment therewith as said blank advances thereunder on said carrier means, and means acting on said advancing blank in advance of said score lines and differentially with respect to said carrier means and immediately in advance of said fixed means, said means acting on said advancing blank having a panel engaging portion that moves from below the path of the advancing blank up through said path and subsequently down through said path for partially folding said panel portions to a raised disposition for folding abutment at said fixed means, said panel engaging portion passing down through said path in advance of the folded blank.

5. In a machine for forming paperboard cartons from a blank therefor having respective panel portions that must be folded double in opposite directions about spaced parallel score lines, movable carrier means for advancing said blank continuously with said spaced parallel score lines extending transversely of the direction of advance and with the direction of advance opposite to the direction in which panel portion folding must be accomplished about the leading of said spaced parallel score lines, a first fixed means mounted above said carrier means in the path of the panel portions foldable about the leading of said score lines for completing the doubling folding of said panel portions by abutment therewith as said blank advances thereunder on said carrier means, a second fixed means mounted above said carrier means in closely spaced relation beyond said first fixed means for receiving thereunder and completing the doubling of the panel portions that are foldable about the trailing of said spaced parallel score lines during continued advance of said blank on said carrier means, and first and second movable means revolving about a common axis located transversely below said carrier means for respectively partially folding the panel portions at the leading of said score lines to a raised disposition for folding abutment at said first fixed means and subsequently folding the panel portions at the trailing of said score lines sufficiently to be received under said second fixed means.

6. In a machine for forming paperboard cartons from a blank therefor having panel portions therein that must be folded double in the same direction as said blank must be advanced for performing other folding operations thereon, movable carrier means for advancing said blank continuously with the folding axis for said panel portions extending transversely and said panel portions trailing therefrom, fixed shoes mounted above said carrier means for receiving thereunder and completing the doubling of said panel portions as said advancing blank rides thereunder on said carrier means, and movable means revolving about an axis located transversely below said carrier means in relation to the advance of said blank thereon, camming means associated with said movable means to move said movable means radially with respect to said axis for folding said trailing panel portions in the direction of said advance sufficiently toward a doubled disposition to be received from said movable means under said fixed shoes.

7. In a machine as defined in claim 6, the structure therein defined and further characterized in that said movable means comprises a radially extending arm member revolving about said axis and a bell crank pivoted at the extending end of said arm member with one end fitted for folding contact with said trailing panel portions and the other end fitted with a cam follower, and in that a fixed cam is arranged in relation to said other bell crank end for actuating the folding motion of said first mentioned bell crank end as said arm member revolves.

8. The method of forming paperboard cartons from a blank therefor having adjacent panel portions that must be folded double and relatively in the same direction about respective spaced parallel score lines into ultimate partially overlapping relation, which method comprises continuously advancing said blank in a longitudinal path with said spaced score lines extending transversely of said path and said adjacent panel portions extending respectively in leading relation from said score lines, pressing each of said adjacent panel portion in advance of said score lines from below said path to a partially folded raised disposition with respect thereto, and obstructing the path of said panel portion at said raised disposition to require said panel portions to fold double relatively during the continued advance of said blank.

9. The method of forming paperboard cartons from a blank therefor having respective panel portions that must be folded double in opposite directions about spaced parallel score lines, which method comprises continuously advancing said blank in a longitudinal path with said spaced parallel score lines extending transversely of said path and with the direction of advance opposite to the direction in which panel portion folding must be accomplished about the leading of said spaced parallel score lines, flexing said respective panel portions oppositely downward and upward with respect to the direction of advance and thereby initially freeing said panel portions for relative folding with respect to each other, pressing from below said path to a partially folded raised disposition with respect thereto the panel portion foldable about the leading of said score lines, obstructing the path of said partially folded panel portion at said raised disposition to require said panel portion to fold double during the continued advance of said blank, then immediately pressing from below said path to a substantially complete double folded disposition the panel portions foldable about the trailing of said score lines, and maintaining said respective panel portions folded double as said blank continues to advance.

References Cited in the file of this patent
UNITED STATES PATENTS

| | | |
|---|---|---|
| 2,774,286 | La Bombard | Dec. 18, 1956 |
| 2,839,972 | Labombarde | June 24, 1958 |
| 2,883,917 | La Bombard | Apr. 28, 1959 |

UNITED STATES PATENT OFFICE
CERTIFICATE OF CORRECTION

Patent No. 3,014,415  December 26, 1961

Samuel W. Pierce

It is hereby certified that error appears in the above numbered patent requiring correction and that the said Letters Patent should read as corrected below.

Column 2, line 72, after "actuating" insert -- cam --; column 3, line 1, before "auxiliary" insert -- the --; line 43, before "fingers" insert -- fixed --; line 46, for "downwardly" read -- downward --; same column 3, line 68, for "below" read -- beyond --; column 9, line 18, for "portion" read -- portions --.

Signed and sealed this 29th day of May 1962.

(SEAL)
Attest:

ERNEST W. SWIDER
Attesting Officer

DAVID L. LADD
Commissioner of Patents